US012234671B2

(12) United States Patent
Luebeck

(10) Patent No.: US 12,234,671 B2
(45) Date of Patent: Feb. 25, 2025

(54) LATCH ASSEMBLY FOR VERTICAL DOOR

(71) Applicant: HONEYWELL INTERNATIONAL INC., Charlotte, NC (US)

(72) Inventor: Jon Marc Luebeck, Stayton, OR (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 117 days.

(21) Appl. No.: 17/254,356

(22) PCT Filed: Aug. 14, 2020

(86) PCT No.: PCT/US2020/046487
§ 371 (c)(1),
(2) Date: Dec. 21, 2020

(87) PCT Pub. No.: WO2021/034707
PCT Pub. Date: Feb. 25, 2021

(65) Prior Publication Data

US 2022/0049525 A1 Feb. 17, 2022

Related U.S. Application Data

(60) Provisional application No. 62/890,222, filed on Aug. 22, 2019.

(51) Int. Cl.
*E05B 47/00* (2006.01)
*E05B 47/06* (2006.01)
(Continued)

(52) U.S. Cl.
CPC .......... *E05B 47/0046* (2013.01); *E05B 63/24* (2013.01); *E05B 65/0021* (2013.01); *E05B 47/0696* (2013.01)

(58) Field of Classification Search
CPC .. E05B 47/0046; E05B 47/0696; E05B 63/24; E05B 63/244; E05B 65/0021;
(Continued)

(56) References Cited

U.S. PATENT DOCUMENTS 1,880,850 A 10/1932 Dautrick
7,484,391 B1 2/2009 Moore
(Continued)

FOREIGN PATENT DOCUMENTS

BE 1021635 B1 * 12/2015 ......... E05B 47/0004
DE 19743655 A1 * 4/1999 ........... E05B 17/007
(Continued)

OTHER PUBLICATIONS

International Search Report and Written Opinion for International Application No. PCT/US2020/046487 dated Nov. 17, 2020.
(Continued)

*Primary Examiner* — Christine M Mills
*Assistant Examiner* — Yahya Sidky
(74) *Attorney, Agent, or Firm* — Seager, Tufte & Wickhem, LLP

(57) ABSTRACT

A vertical door latch assembly includes a bolt that has a catch portion located adjacent a distal end of the bolt. A latch has a retention feature for engaging the catch portion of the bolt. An electro-mechanical locking assembly secures the latch between a locking position preventing movement of the bolt and a non-locking position allowing movement of the bolt. A controller is in electrical communication with the electro-mechanical locking assembly and is configured to direct the electro-mechanical locking assembly between the locking position and the non-locking position.

18 Claims, 5 Drawing Sheets

(51) Int. Cl.
*E05B 63/24* (2006.01)
*E05B 65/00* (2006.01)

(58) Field of Classification Search
CPC ...... E05B 63/12; E05B 63/121; E05B 15/022; Y10T 292/696; Y10T 292/699; Y10T 292/702; Y10T 292/1043; Y10T 292/1082; Y10S 292/36; E06B 2009/801; E06B 2009/804; E06B 2009/805
USPC .......................................................... 49/449
See application file for complete search history.

(56) References Cited

U.S. PATENT DOCUMENTS

| | | | | |
|---|---|---|---|---|
| 9,045,919 | B2 | 6/2015 | Aragon et al. | |
| 9,353,550 | B1 | 5/2016 | Smith, III | |
| 10,062,226 | B2 | 8/2018 | Kuenzi et al. | |
| 10,062,232 | B2 | 8/2018 | Zastrow et al. | |
| 10,062,233 | B1 | 8/2018 | Rogers et al. | |
| 10,089,801 | B1 | 10/2018 | Musabeyoglu et al. | |
| 10,121,301 | B1 | 11/2018 | Ren et al. | |
| 10,134,211 | B2 | 11/2018 | Hogan | |
| 10,189,884 | B2 | 1/2019 | Petersson | |
| 10,214,947 | B2 * | 2/2019 | Marsh | E05C 3/12 |
| 10,858,864 | B2 | 12/2020 | Pfunder | |
| 11,248,395 | B2 | 2/2022 | Stein et al. | |
| 11,505,967 | B2 | 11/2022 | Mantena et al. | |
| 2005/0235711 | A1 * | 10/2005 | Martin | E05B 65/08 70/100 |
| 2006/0117820 | A1 | 6/2006 | Lanigan et al. | |
| 2009/0206985 | A1 | 8/2009 | Hsia et al. | |
| 2012/0261081 | A1 * | 10/2012 | Curtis | E05B 47/0607 292/201 |
| 2013/0033045 | A1 | 2/2013 | Worm et al. | |

FOREIGN PATENT DOCUMENTS

| | | | | |
|---|---|---|---|---|
| WO | WO-9801641 A1 * | 1/1998 | | E05B 63/18 |
| WO | 2016093873 | 6/2016 | | |
| WO | 2020068030 | 4/2020 | | |
| WO | WO-2020068030 A1 * | 4/2020 | | E05B 47/0004 |

OTHER PUBLICATIONS

International Preliminary Report for Patentability for International Application No. PCT/US2020/046487 dated Mar. 3, 2022.

* cited by examiner

LATCH ASSEMBLY FOR VERTICAL DOOR

CROSS-REFERENCE TO RELATED APPLICATIONS

This application claims priority to U.S. Provisional Application No. 62/890,222, which was filed on Aug. 22, 2019 and is incorporated herein by reference.

BACKGROUND

The present disclosure relates to locks for doors that open vertically, such as rollup doors or overhead doors. More specifically, the present disclosure relates to a lock and control system for selectively granting access through rollup or overhead doors.

Self-storage centers typically provide multiple individual storage areas, each of which is accessible through a lockable, vertically opening, rollup door. In existing installations, each customer is provided a traditional keyed lock or provides their own traditional keyed lock to control access to an assigned storage area.

SUMMARY

In one exemplary embodiment, a vertical door latch assembly includes a bolt that has a catch portion located adjacent a distal end of the bolt. A latch has a retention feature for engaging the catch portion of the bolt. An electro-mechanical locking assembly secures the latch between a locking position preventing movement of the bolt and a non-locking position allowing movement of the bolt. A controller is in electrical communication with the electro-mechanical locking assembly and is configured to direct the electro-mechanical locking assembly between the locking position and the non-locking position.

In a further embodiment of any of the above, the electro-mechanical locking assembly includes an electro-mechanical actuator for engaging the latch.

In a further embodiment of any of the above, the electro-mechanical actuator includes a motor rotatably attached to a cam.

In a further embodiment of any of the above, the latch includes at least one flexible finger fixed about a first end and movable about a second end.

In a further embodiment of any of the above, the cam engages the at least one flexible finger to flex the at least one finger between the locking position and the non-locking position.

In a further embodiment of any of the above, the at least one flexible finger includes a plurality of flexible fingers.

In a further embodiment of any of the above, the at least one flexible finger includes the retention feature for engaging the catch portion of the bolt.

In a further embodiment of any of the above, the latch includes a pivot member rotatable about a pivot axis.

In a further embodiment of any of the above, the latch includes a bolt stop for engaging the distal end of the bolt and rotating the latch about the pivot axis.

In a further embodiment of any of the above, the latch includes a lock mechanism catch portion for fixing the latch when in the locking position.

In a further embodiment of any of the above, the latch defines a plate with an L-shaped arrangement of features including the retention feature located on a first leg of the L-shaped arrangement and the bolt stop and lock mechanism catch portion on a second leg of the L-shaped arrangement.

In a further embodiment of any of the above, the latch includes a first plate spaced from a second plate with the retention feature, the pivot member, the bolt stop, and the lock mechanism catch portion extending between the first plate and the second plate.

In a further embodiment of any of the above, a bolt assembly includes a housing for supporting the bolt and a handle for moving the bolt relative to the housing.

In a further embodiment of any of the above, the controller is in electrical communication with a wireless communication device and programmed to direct the electro-mechanical locking assembly between the locking position and the non-locked position in response to a signal from the wireless communication device.

In another exemplary embodiment, a method of operating a vertical door latch assembly includes the step of moving a latch from a non-locking position to a locking position by engaging the latch with a bolt while inserting the bolt through an aperture to prevent vertical movement of a vertical door. A catch portion on a bolt is engaged with a retention feature on a latch to prevent the bolt from moving relative to the latch when the bolt is in the locking position.

In a further embodiment of any of the above, the latch relative to the bolt is secured with an electro-mechanical locking assembly that has an electro-mechanical actuator for locking the latch relative to the bolt when in the locking position. The latch includes at least one plate that supports the retention feature, a pivot member, and a bolt stop and the catch portion on the bolt is located adjacent a distal end of the bolt.

In a further embodiment of any of the above, the bolt stop on the latch is engaged when moving the bolt from the non-locking position to the locking position.

In a further embodiment of any of the above, the latch is released from the locking mechanism allowing the latch to pivot into the non-locking position.

In a further embodiment of any of the above, the latch is released relative to bolt by engaging at least one finger on the latch with a cam.

In a further embodiment of any of the above, a signal is sent from a controller to an electro-mechanical lock assembly to secure the latch relative to the electro-mechanical lock assembly when in the locking position.

DETAILED DESCRIPTION

Figure 1:
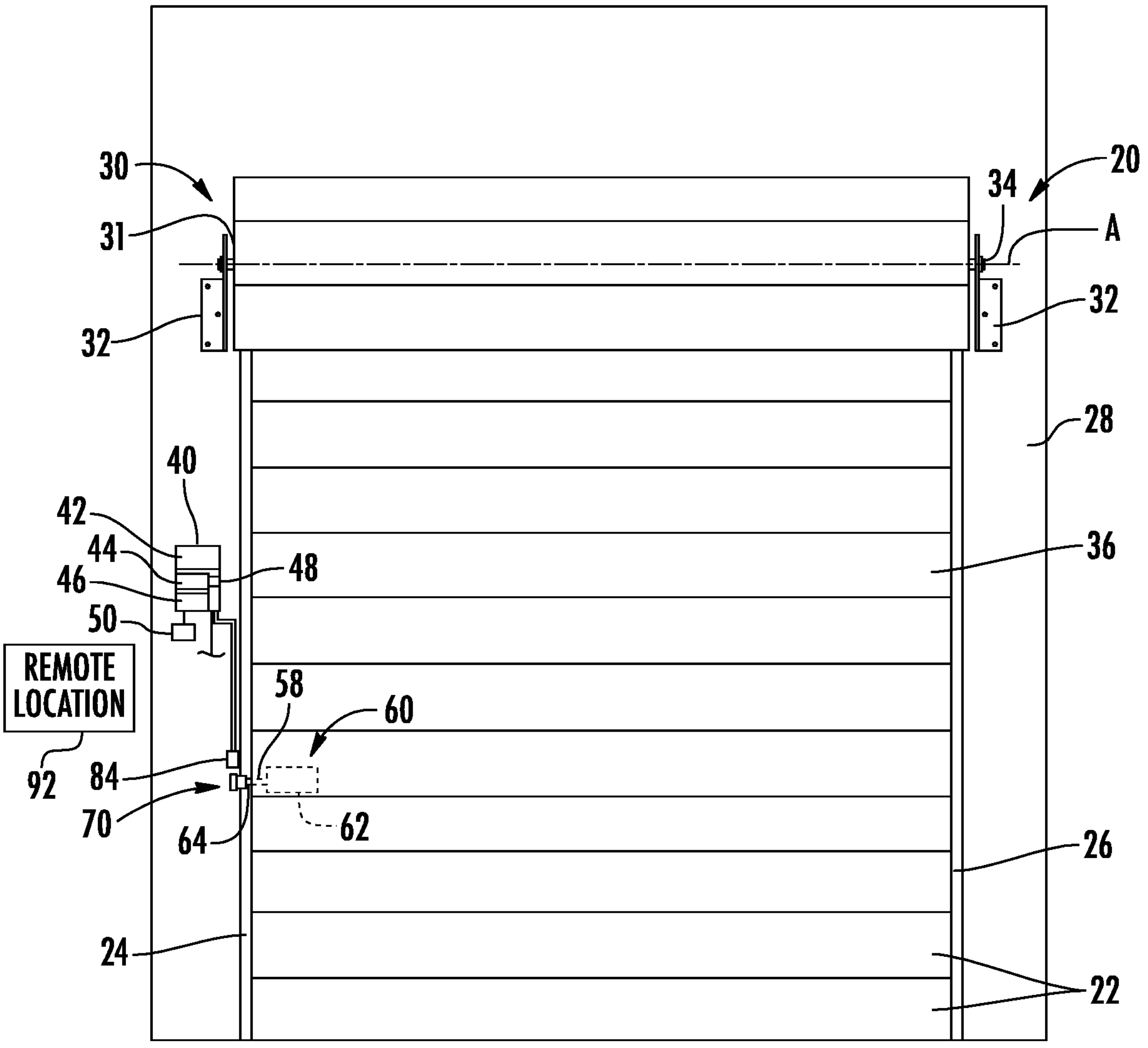
FIG. 1 illustrates an interior view of an example vertical door.
Figure 2:
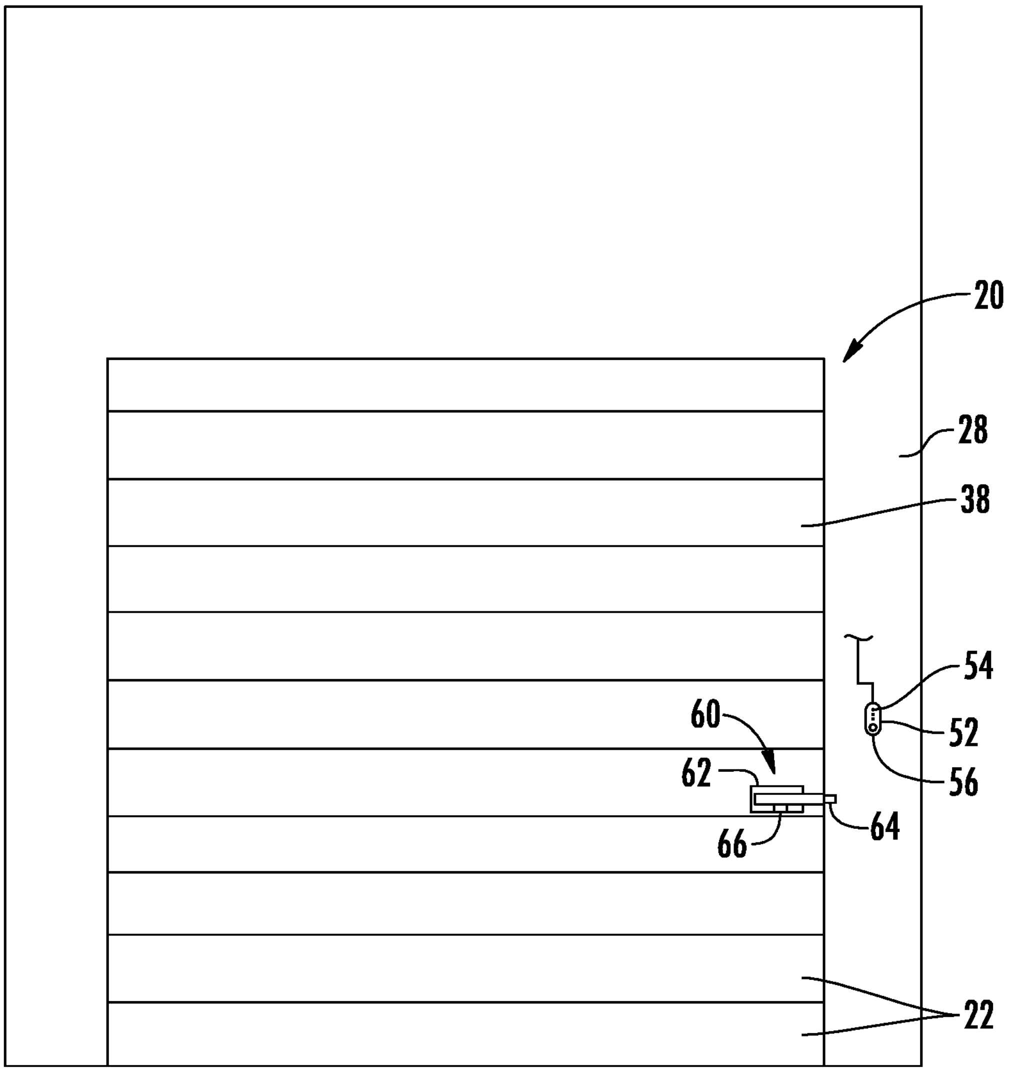
FIG. 2 illustrates an exterior view of the example vertical door of FIG. 1.

FIGS. 1 and 2 illustrate an example vertical door assembly 20, such as a rollup or overhead style door. The vertical door assembly 20 includes a plurality of slats 22 that are rotatably connected to each other along their length and slideably connected to a first vertical guide rail 24 and a second vertical guide rail 26 along respective opposite ends of the slats 22. In the illustrated example, the vertical door assembly 20 is used to selectively enclose an opening in a wall 28. The plurality of slats 22 include an interior surface 36 (FIG. 1) that faces towards an enclosed space and an exterior surface 38 (FIG. 2) that faces away from the enclosed space. The wall 28 could be a wall locating a building, a shipping container, a trailer, or any other type of arrangement where it is desirable to selectively enclose an opening in a structure.

The vertical door assembly 20 includes a tension wheel assembly 30 having a drum 31 supported by an axle 34 to allow the plurality of slats 22 to move through the first and second guide rails 24, 26 and collapse into a closed position. The tension wheel assembly 30 allows the plurality of slats 22 to roll around the axle 34 about an axis of rotation A to store the plurality of slats 22 above the opening in the wall 28. Additionally, the tension wheel assembly 30 could be spring loaded to reduce the force needed to raise the plurality of slats 22. In the illustrated example, the axle 34 is supported relative to the wall 28 through a bracket 32 located adjacent opposite ends of the axle 34 and fixed relative to the wall 28.

The vertical door assembly 20 utilizes an electronic control module 40 in electrical communication with an electro-mechanical lock assembly 84 that selectively secures a latch 70 relative to a bolt 64 as will be described further below. In the illustrated example, the electronic control module 40 includes a printed circuit board in communication with memory 42, a processor 44, a wireless communications device 46, and at least one indicator light 48. The memory 42 is preprogrammed and in communication with the processor 44, such as a controller, to perform the operations described below.

In one example, the wireless communications device 46 is capable of forming a Wi-Fi or Bluetooth connection to transfer a desired locked or unlocked request from a user wirelessly to the wireless communications device 46 to change an operating state of the electro-mechanical lock assembly 84 and the latch 70. The electronic control module 40 may also utilize the at least one indicator light 48 to display a connection status with the user formed with the wireless communications device 46 and/or a locked status of the bolt 64 relative to the latch 70. The electronic control module 40 may also be in electrical communication with a battery backup 50 to provide power to the electronic control module 40 during power outages to ensure that a sure is able to maintain access to the enclosed space through the vertical door assembly 20.

An interface 52 may also be in electrical communication with the electronic control module 40 and located adjacent the exterior surface 38 of the vertical door assembly 20 to allow a user adjacent to the exterior surface 38 of the vertical door assembly 20 to be able to communicate with the electronic control module 40. The interface 52 may include at least one light 54 that indicates a locked status of the bolt 64 and/or a connection status with the user formed with the wireless communications device 46.

Figure 3:
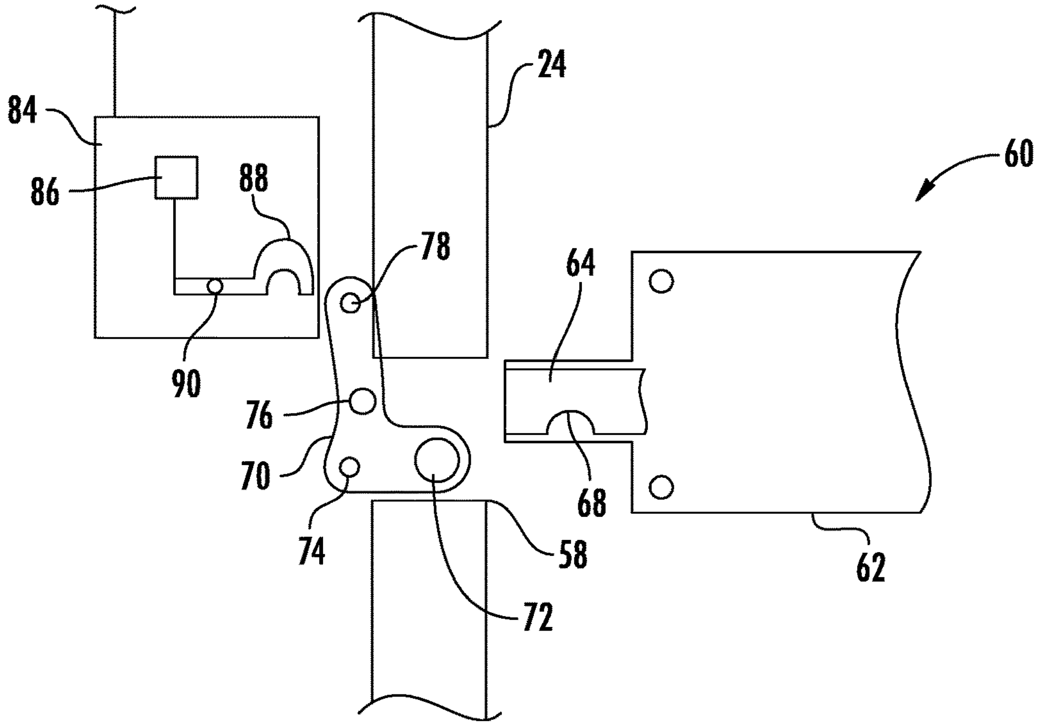
FIG. 3 is an enlarged schematic view of an example bolt assembly and latch in a non-locking position.

FIG. 3 illustrates an enlarged view of an example configuration of a bolt assembly 60, the latch 70, and the electro-mechanical lock assembly 84. In the illustrated example, the bolt assembly 60 includes a bolt housing 62 that attaches to the exterior surface 38 of one of the plurality of slats 22 of the vertical door assembly 20. The bolt assembly 60 also includes the bolt 64, which is slidable relative to the bolt housing 62 to allow the bolt 64 to engage an aperture 58 (FIG. 1) in the first vertical guide rail 24 to prevent the plurality of slats 22 from moving relative to the first and second vertical guide rails 24, 26.

In the illustrated example, the bolt 64 includes a bolt handle 66 that allows a user to manually move the bolt horizontally into and out of the aperture 58 in the first vertical guide rail 24. However, this disclosure also applies to the bolt assembly 60, latch 70, and electro-mechanical lock assembly 84 being located adjacent the second vertical guide rail 26. Furthermore, the aperture 58 could be located separate from one of the first or second vertical guide rails 24, 26 and be located in the wall 28 or another structure that is fixed relative to the wall 28.

The bolt 64 includes a bolt catch portion 68 located adjacent a distal end of the bolt 64. In the illustrated example, the bolt catch portion 68 defines a semi-circular recess that mates with a retention feature 72 on the latch 70. However, the bolt catch portion 68 and retention feature 72 could have other shapes as long a profile of the bolt catch portion 68 matches a profile of the retention feature 72 to ensure a locking engagement between the bolt catch portion 68 and the retention feature 72 to prevent the bolt 64 from being removed from the aperture 58.

Figure 4:
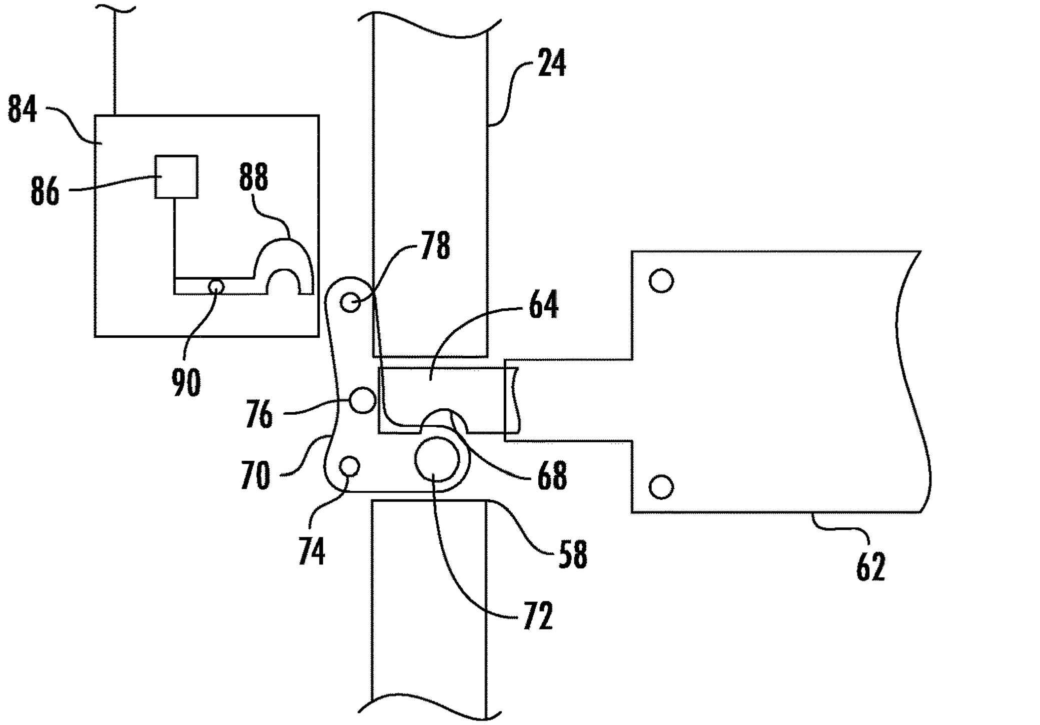
FIG. 4 illustrates an example schematic view of the example bolt assembly and latch in an intermediate position.

During operation, the latch 70 pivots about a pivot member 74, such as a pin, to move the retention feature 72 into engagement with the bolt catch portion 68 to define a locking position and prevent the bolt 64 from being removed from the aperture 58. Additionally, the bolt 64 moves in a linear direction. The latch 70 is weighted such that the latch 70 pivots towards the bolt 64 when the bolt 64 is not in engagement with the latch 70. In order to pivot the latch 70 about the pivot member 74, the bolt 64 contacts a bolt stop 76, such as a pin, on the latch 70 to pivot the latch 70. When the latch 70 pivots from translational movement from the bolt 64, the bolt catch portion 68 moves into contact with the retention feature 72 as shown in FIG. 3 through FIG. 5.

Figure 5:
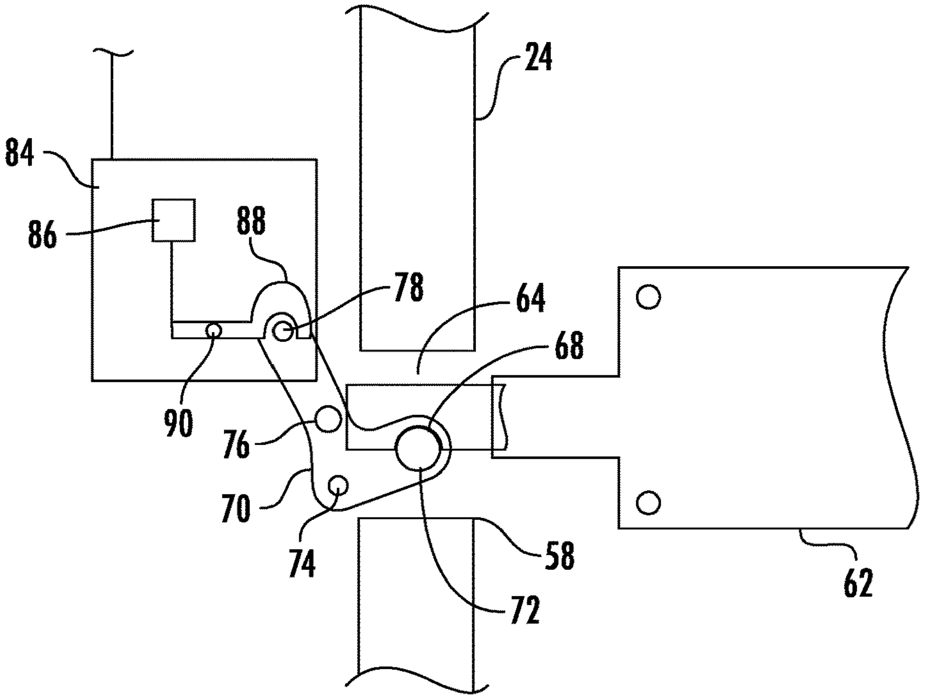
FIG. 5 illustrates an example schematic view of the example bolt assembly and latch in a locking position.

In particular, as shown in FIG. 5, the retention feature 72 is located in engagement with the bolt catch portion 68 to prevent the bolt 64 from moving outside of the aperture 58 to maintain the vertical door assembly 20 in a closed and locked position. The retention feature 72 remains secured in the bolt catch portion 68 by a hook 88 in the electro-mechanical lock mechanism engaging a lock mechanism catch portion 78 on the latch 70. However, other types of engagement between the electro-mechanical lock assembly 84 and the lock mechanism catch portion 78 could be used such as a magnetic lock or other type of mechanical engagement. Additionally, in the illustrated embodiment, the retention feature 72 is located close to the pivot member 74 than the lock mechanism catch portion 78 and includes a larger cross-sectional area and/or weight than the lock mechanism catch portion 78.

When the hook 88 has engaged the locked mechanism catch portion 78, the latch 70 is fixed from pivoting about the pivot member 74. If it is desired to open the vertical door assembly 20, a user will communicate with the electronic control module 40 as described further below to activate an actuator 86 in the electro-mechanical lock assembly 84 to pivot the hook 88 about the pivot member 90 and release the lock mechanism catch portion 78 from the electro-mechanical lock assembly 84. Because the latch 70 is weighted such that lock mechanism catch portion 78 pivots towards the aperture 58, as the bolt 64 is moved to an open position, the latch 70 pivots to remove the retention feature 72 from the bolt catch portion 68 and move into a non-locking position.

This allows a user to then open the vertical door assembly 20 by sliding the bolt 64 out of the aperture 58.

Figure 6:
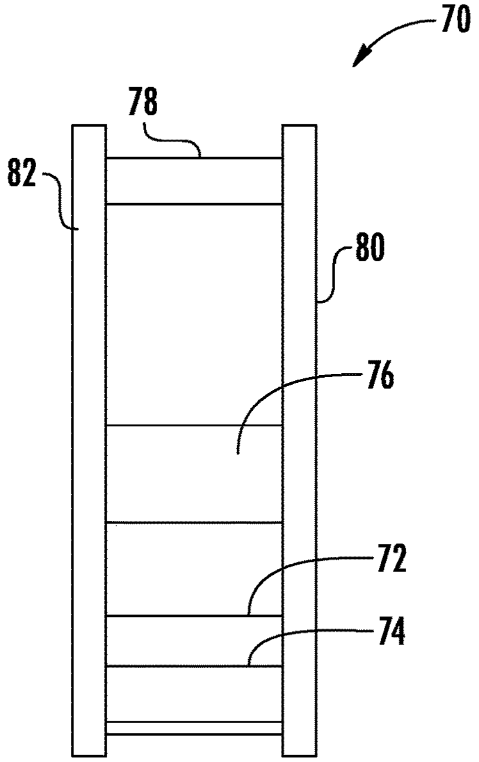
FIG. 6 illustrates an example latch.

In the illustrated example shown in FIG. 6, the latch 70 includes a first plate 80 spaced from a second plate 82 with the retention feature 72, the pivot member 74, the bolt stop 76, and the lock mechanism catch portion 78 extending between the first plate 80 and the second plate 82. In another example, the latch 70 may only include one of the first plate or the second plate 82, or alternatively, the retention feature 72, the pivot member 74, the bolt stop 76, and the lock mechanism catch portion 78 could extend from opposing sides of the first plate 80. Although the first plate 80 and the second plate 82 define an L-shape, the first and second plates 80, 82 could have a number of different shapes. However, the latch 70 defines an L-shaped arrangement of features including the retention feature 72 located on a first leg of the L-shaped arrangement and the bolt stop 76 and lock mechanism catch portion 78 on a second leg of the L-shaped arrangement.

Figure 7:
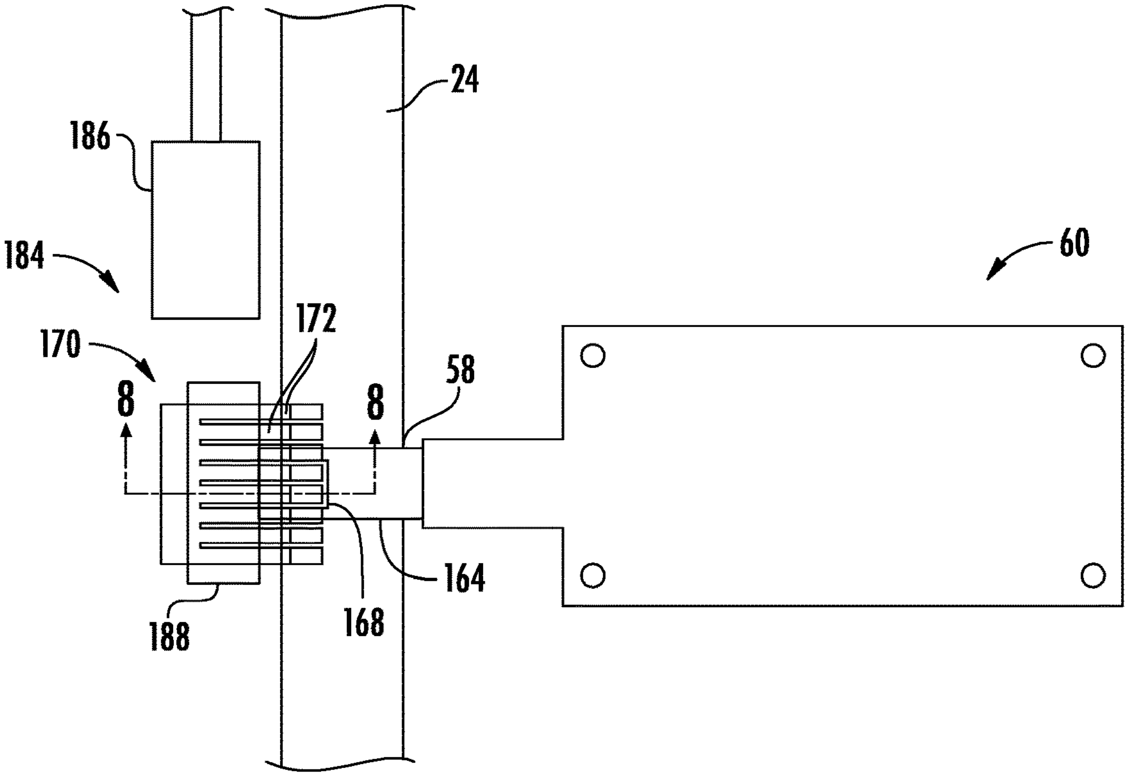
FIG. 7 illustrates an enlarged schematic view of another example bolt assembly and latch.

FIG. 7 illustrates another example bolt 164, latch 170, and electro-mechanical lock assembly 84. In the illustrated example, the electro-mechanical lock assembly 184 includes a motor 186 having an output shaft that rotates a cam 188 having a non-circular or oblong cross-section. The non-circular shape of the cam 188 allows the cam 188 to selectively pivot a plurality of fingers 172 on the latch 170 between an unlocked position, as shown in FIG. 8B, and a locked position, as shown in FIG. 8A.

When the cam 188 is in a locking position (FIG. 8A), a retention feature 176 on at least one of the plurality of fingers 172 is located within a bolt catch portion 168 in the bolt 164. By having a plurality of fingers 172 arranged vertically that each include one of the retention features 176, the bolt 164 can have greater variation in vertical position relative to the aperture 58 in the first vertical guide rail 124 while still allowing the latch 170 prevent the bolt 164 from being removed from the aperture 58.

Figure 8A:
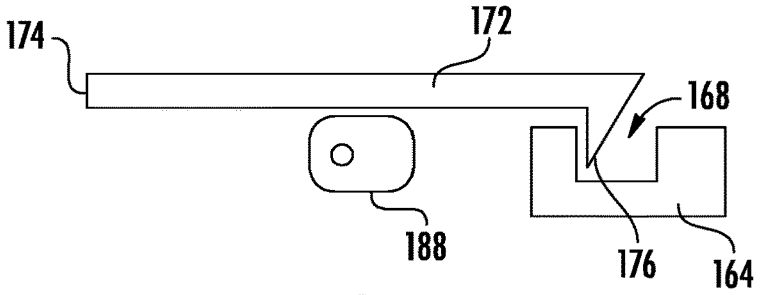
FIG. 8A schematically illustrates the latch of FIG. 7 in a first position.
Figure 8B:
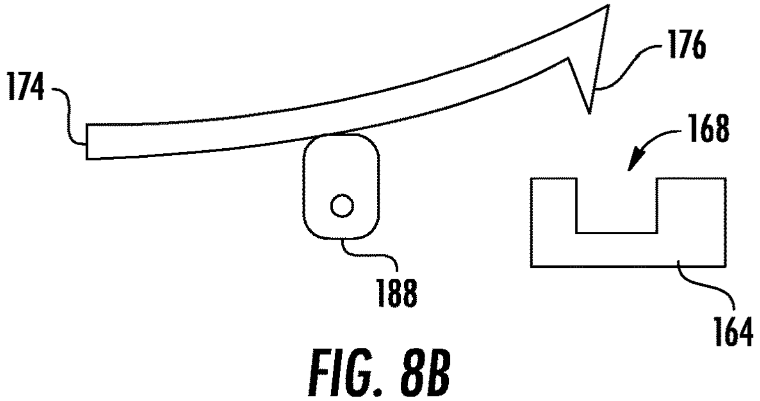
FIG. 8B schematically illustrates the latch of FIG. 7 in a second position.

When the bolt 164 is moved to the locking position towards the plurality of fingers 172, at least one of the plurality of fingers 172 includes a corresponding vertical position as the bolt 164 and flexes horizontally to allow the retention feature 176 to travel over the distal end of the bolt 164 and into the bolt catch portion 168 as shown in FIG. 8A. When the user desires for the bolt 164 to be removed from the latch 170 and into a non-locking position, the motor 186 rotates the cam 188 to a position that flexes all of the plurality of fingers 172 to a position out of engagement with the bolt catch portion 168. This allows the bolt 164 to be freely removed from the aperture 58 to allow the vertical door assembly 20 to be opened and allow access through the wall 28.

During operation of the electro-mechanical lock assembly 84, 184, the latch 70, 170, and the bolt 64, 164, respectively, a user communicates with the electronic control module 40 through at least one of the wireless communications device 46 or the interface 52. The communication between the user and the wireless communications device 46 may occur through an application or web interface on a user's mobile device through a Bluetooth or other type of wireless connection. The electronic control module 40 can then send an electrical signal to the electro-mechanical lock assembly 84, 184 to move the latch 70, 170, respectively to a non-locking position to allow the bolt 64, 164 to be released from the aperture 58 or a locking position to prevent the bolt 64, 164 from being released from the aperture 58.

Additionally, the electronic control module 40 can store a record of the user that accessed the wireless communications device 46 on the memory 42 on the electronic control module 40. The record can include the identity of the user based on the device used to access the wireless communications device 46 and the time of the request. Alternatively, the electronic control module 40 can send the record to a remote location 92 (FIG. 1) through use of the wireless communications device 46 to monitor access through the vertical door assembly 20. Additionally, the remote location 92 can send a signal to the electronic control module 40 through the wireless communications device 46 to direct the actuator lock assembly the electro-mechanical lock assembly 84, 184 to move between one of the locking position and non-locking position.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A vertical door latch assembly comprising:

a bolt having a catch portion comprising a recess formed within the bolt at a location that is spaced from a distal end face of the bolt, wherein the bolt includes a first outer surface and a second outer surface facing opposite the first outer surface, and with the distal end face extending from the first outer surface to the second outer surface;

wherein the recess is closed to the first outer surface and open to the second outer surface;

wherein the bolt is slidable relative to a bolt housing to allow the bolt to engage an aperture;

a latch having a retention feature that is non-rotatable relative to the latch and which engages the catch portion of the bolt, wherein a profile of the catch portion matches a profile of the retention feature to ensure a locking engagement between the catch portion and the retention feature to prevent the bolt from being removed from the aperture;

an electro-mechanical locking assembly for securing the latch between a locking position preventing movement of the bolt and a non-locking position allowing movement of the bolt; and a controller in electrical communication with the electro-mechanical locking assembly and configured to direct the electro-mechanical locking assembly between the locking position and the non-locking position;

wherein the latch has a lever body with the retention feature for engaging the catch portion of the bolt, and wherein the distal end face of the bolt engages a portion of the lever body spaced from the retention feature and rotates the lever body to move to the locking position.

2. The assembly of claim 1, wherein the electro-mechanical locking assembly includes an electro-mechanical actuator for engaging the latch, and wherein the bolt is slidable relative to the bolt housing along a horizontal linear path to allow the bolt to engage the aperture, and wherein in response to a signal from the controller to the electro-mechanical locking assembly, the retention feature is pivoted out of the catch portion and the bolt is moveable along the horizontal linear path to an unlocked position.

3. The assembly of claim 2, wherein the latch includes a pivot member rotatable about a pivot axis.

4. The assembly of claim 3, wherein the bolt moves in a linear direction such that the distal end face of the bolt contacts a bolt stop to rotate the pivot member about the pivot axis.

5. The assembly of claim 4, wherein the latch includes a lock mechanism catch portion for fixing the latch when in the locking position.

6. The assembly of claim 5, wherein the latch comprises at least one pivoting plate with an L-shaped arrangement of features including the retention feature located on a first leg of the L-shaped arrangement and the bolt stop and the lock mechanism catch portion located on a second leg of the L-shaped arrangement.

7. The assembly of claim 5, wherein the at least one pivoting plate includes a first pivoting plate spaced from a second pivoting plate with the retention feature, the pivot member, the bolt stop, and the lock mechanism catch portion each comprising a pin body that extends between the first pivoting plate and the second pivoting plate.

8. The assembly of claim 2, wherein the controller is in electrical communication with a wireless communication device and programmed to direct the electro-mechanical locking assembly between the locking position and the non-locking position in response to a signal from the wireless communication device.

9. The assembly of claim 1, further comprising a bolt assembly including a housing for supporting the bolt and a handle for moving the bolt relative to the housing.

10. The assembly of claim 1, wherein the electro-mechanical locking assembly includes an electro-mechanical actuator.

11. A method of operating a vertical door latch assembly, the method comprising:

providing a latch comprising a lever body with a retention feature;

providing a bolt that includes a first outer surface, a second outer surface facing opposite the first outer surface, and a distal end face extending from the first outer surface to the second outer surface, and wherein the bolt comprises a catch portion that is closed to the first outer surface and open to the second outer surface;

moving the latch from a non-locking position to a locking position in response to linear movement of the bolt being inserted through an aperture such that the distal end face of the bolt engages a portion of the lever body spaced from the retention feature and rotates the latch to prevent vertical movement of a vertical door; and engaging the catch portion on the bolt with the retention feature on the latch to prevent the bolt from moving relative to the latch when the bolt is in the locking position, wherein a profile of the catch portion matches a profile of the retention feature to ensure a locking engagement between the catch portion and the retention feature to prevent the bolt from being removed from the aperture.

12. The method of claim 11, including securing the latch relative to the bolt with an electro-mechanical locking assembly having an electro-mechanical actuator for locking the latch relative to the bolt when in the locking position and wherein the lever body comprises at least one plate supporting the retention feature, a pivot member, and a bolt stop, and wherein the catch portion comprises a recess formed within the bolt at a location that is spaced from a distal end face of the bolt, and wherein the portion of the lever body that is spaced from the retention feature comprises the bolt stop.

13. The method of claim 12, including sliding the bolt in a linear direction such that the distal end face engages the bolt stop to rotate the pivot member when moving the bolt from the non-locking position to the locking position.

14. The method of claim 12, including releasing the latch from a locking mechanism and allowing the latch to pivot into the non-locking position.

15. The method of claim 11, including:

sending a signal from a controller to an electro-mechanical lock assembly to secure the latch relative to the electro-mechanical lock assembly when in the locking position and the electro-mechanical lock assembly includes an electro-mechanical actuator; and in response to a control signal, pivoting the retention feature out of the catch portion to move the bolt along a horizontal linear path to an unlocked position.

16. The method of claim 11, including securing the latch relative to the bolt with an electro-mechanical locking assembly having an electro-mechanical actuator for locking the latch relative to the bolt when in the locking position.

17. A vertical door latch assembly comprising:

a body moveable along a linear path between a locked position and an unlocked position, the body including a catch;

a latch that is pivotable about an axis between an engaged position where at least a portion of the latch is received within the catch and a disengaged position where the portion of the latch is released from the catch, and wherein the portion of the latch comprises:

an end of a lever body, the lever body including a protrusion that is spaced from the end of the lever body and is engaged by the body to pivot the end of the lever body into the catch to provide the engaged position; or a plurality of flexible fingers with at least one of the plurality of flexible fingers being received within the catch to provide the engaged position;

an electro-mechanical locking assembly securing the latch between the locked position and the unlocked position, wherein the electro-mechanical locking assembly includes an actuator that provides output along a linear path to pivot the latch from the locked position to the unlocked position; and a controller in electrical communication with the electro-mechanical locking assembly and configured to direct the actuator to move the latch from the locked position to the unlocked position; wherein:

the catch comprises an abutment surface and the latch comprises a lever body having a pair of distal ends;

the portion of the latch comprises one of the pair of distal ends of the lever body that engages the abutment surface, the lever body including the protrusion that is spaced from the one of the pair of distal ends of the lever body and is engaged by the body to pivot the end of the lever body into the catch to provide the engaged position; and the lever body comprises a curved body having a portion between the pair of distal ends that is pivotally connected to a fixed structure and an opposite end comprising the other of the pair of distal ends that cooperates with the actuator to move from the locked position to the unlocked position, and wherein the protrusion comprises a bolt stop that is positioned between the one end and the opposite end.

18. The vertical door latch assembly of claim 17, wherein the catch comprises a recess formed within the body at a location that is spaced from a distal end face of the body, and wherein the body includes a first outer surface and a second outer surface facing opposite the first outer surface, and with the distal end face extending from the first outer surface to the second outer surface, and wherein the recess is closed to the first outer surface and open to the second outer surface.

* * * * *